United States Patent
Ly et al.

(10) Patent No.: US 11,956,649 B2
(45) Date of Patent: Apr. 9, 2024

(54) REFERENCE SIGNAL FOR REMOTE INTERFERENCE MANAGEMENT

(71) Applicant: QUALCOMM Incorporated, San Diego, CA (US)

(72) Inventors: Hung Dinh Ly, San Diego, CA (US); Huilin Xu, San Diego, CA (US); Joseph Binamira Soriaga, San Diego, CA (US); Tingfang Ji, San Diego, CA (US); Peter Gaal, San Diego, CA (US); Jay Kumar Sundararajan, San Diego, CA (US); Yeliz Tokgoz, San Diego, CA (US); Naga Bhushan, San Diego, CA (US); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/261,443

(22) PCT Filed: Jul. 28, 2018

(86) PCT No.: PCT/CN2018/097692
§ 371 (c)(1),
(2) Date: Jan. 19, 2021

(87) PCT Pub. No.: WO2020/024081
PCT Pub. Date: Feb. 6, 2020

(65) Prior Publication Data
US 2021/0321268 A1 Oct. 14, 2021

(51) Int. Cl.
*H04W 24/02* (2009.01)
*H04B 17/345* (2015.01)
(Continued)

(52) U.S. Cl.
CPC .......... *H04W 24/02* (2013.01); *H04B 17/345* (2015.01); *H04L 5/0048* (2013.01); *H04W 24/10* (2013.01)

(58) Field of Classification Search
CPC .... H04W 24/02; H04W 24/10; H04B 17/345; H04L 5/0048
See application file for complete search history.

(56) References Cited

U.S. PATENT DOCUMENTS

| | | | |
|---|---|---|---|
| 10,505,597 B2 | 12/2019 | Soriaga et al. | |
| 2011/0310747 A1* | 12/2011 | Seo | H04W 72/541 370/278 |

(Continued)

FOREIGN PATENT DOCUMENTS

| | | |
|---|---|---|
| CN | 104735789 A | 6/2015 |
| CN | 105337688 A | 2/2016 |

(Continued)

OTHER PUBLICATIONS

International Search Report and Written Opinion—PCT/CN2018/097692—ISA/EPO—dated Apr. 8, 2019.

(Continued)

*Primary Examiner* — Noel R Beharry
*Assistant Examiner* — Angelie T Ngo
(74) *Attorney, Agent, or Firm* — Patterson + Sheridan, LLP

(57) ABSTRACT

Certain aspects of the present disclosure provide techniques for remote interference mitigation between base stations using reference signals. Certain aspects provide a method for wireless communication by a first base station (BS). The method includes receiving a reference signal (RS) from a second BS. The method further includes performing inter- (Continued)

ference measurement corresponding to interference from the second BS based on the RS being associated with the second BS.

26 Claims, 10 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2013/0322276 | A1* | 12/2013 | Pelletier | H04W 72/085 |
| | | | | 370/252 |
| 2014/0056190 | A1 | 2/2014 | Qian et al. | |
| 2014/0146782 | A1 | 5/2014 | Gerlach et al. | |
| 2016/0029396 | A1 | 1/2016 | Feng et al. | |
| 2018/0042028 | A1 | 2/2018 | Nam et al. | |
| 2018/0109302 | A1 | 4/2018 | Nagaraja et al. | |
| 2018/0124744 | A1* | 5/2018 | Xue | H04W 72/005 |
| 2019/0349101 | A1* | 11/2019 | Takeda | H04B 7/0452 |
| 2019/0363843 | A1* | 11/2019 | Gordaychik | H04L 1/08 |
| 2020/0195319 | A1* | 6/2020 | Park | H04B 7/0639 |
| 2020/0245173 | A1* | 7/2020 | Kusashima | H04B 7/088 |

FOREIGN PATENT DOCUMENTS

| | | | |
|---|---|---|---|
| CN | 106912112 A | 6/2017 | |
| CN | 107070581 A | 8/2017 | |
| EP | 2549814 A1 | 1/2013 | |
| WO | 2016192590 A1 | 12/2016 | |
| WO | WO-2016192590 A1 * | 12/2016 | H04W 24/10 |
| WO | 2017196604 A1 | 11/2017 | |
| WO | 2018045307 A1 | 3/2018 | |

OTHER PUBLICATIONS

CMCC: "Discussion on Remote Interference Management", 3GPP TSG RAN WG1 Meeting #89, R1-1708401, May 15-19, 2017, May 15, 2017 (May 15, 2017), Sections 3-5, 5 Pages, XP051273594, Retrieved from the Internet: URL: http://www.3gpp.org/ftp/Meetings_3GPP_SYNC/RAN1/Docs/ [Retrieved on May 14, 2017].
Supplementary European Search Report—EP18928468—Search Authority—Munich—dated Feb. 17, 2022.

* cited by examiner

US 11,956,649 B2

REFERENCE SIGNAL FOR REMOTE INTERFERENCE MANAGEMENT

CROSS-REFERENCE TO RELATED APPLICATION

This application is a national stage application under 35 U.S.C. 371 of PCT/CN2018/097692, filed Jul. 28, 2018, which is herein incorporated by reference herein in its entirety for all applicable purposes.

INTRODUCTION

Aspects of the present disclosure relate to wireless communications, and more particularly, to techniques for remote interference mitigation between base stations using reference signals.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first base station (BS). The method includes generating a reference signal (RS) to indicate potential interference to one or more BSs. The method further includes transmitting the RS, the RS being used by the one or more BSs for measuring interference from the first BS.

Certain aspects provide a method for wireless communication by a first base station (BS). The method includes receiving a reference signal (RS) from a second BS. The method further includes performing interference measurement corresponding to interference from the second BS based on the RS being associated with the second BS.

Certain aspects provide a first base station (BS) comprising a memory and a processor coupled to the memory. The processor is configured to generate a reference signal (RS) to indicate potential interference to one or more BSs. The processor is further configured to transmit the RS, the RS being used by the one or more BSs for measuring interference from the first BS.

Certain aspects provide a first base station (BS) comprising a memory and a processor coupled to the memory. The processor is configured to receive a reference signal (RS) from a second BS. The processor is configured to perform interference measurement corresponding to interference from the second BS based on the RS being associated with the second BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
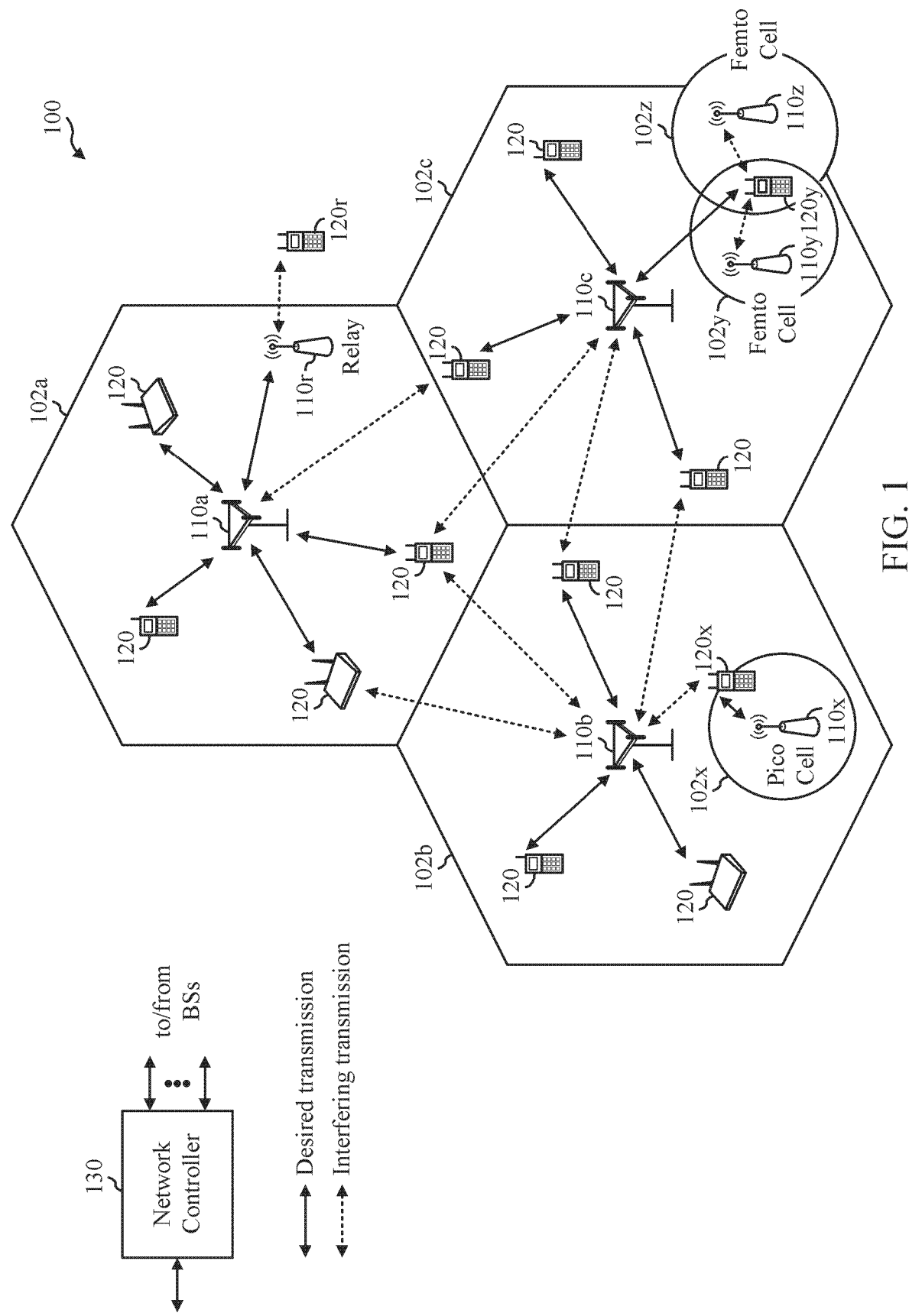
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for remote interference mitigation between base stations using reference signals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, BSs 110 may perform remote interference mitigation as discussed herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
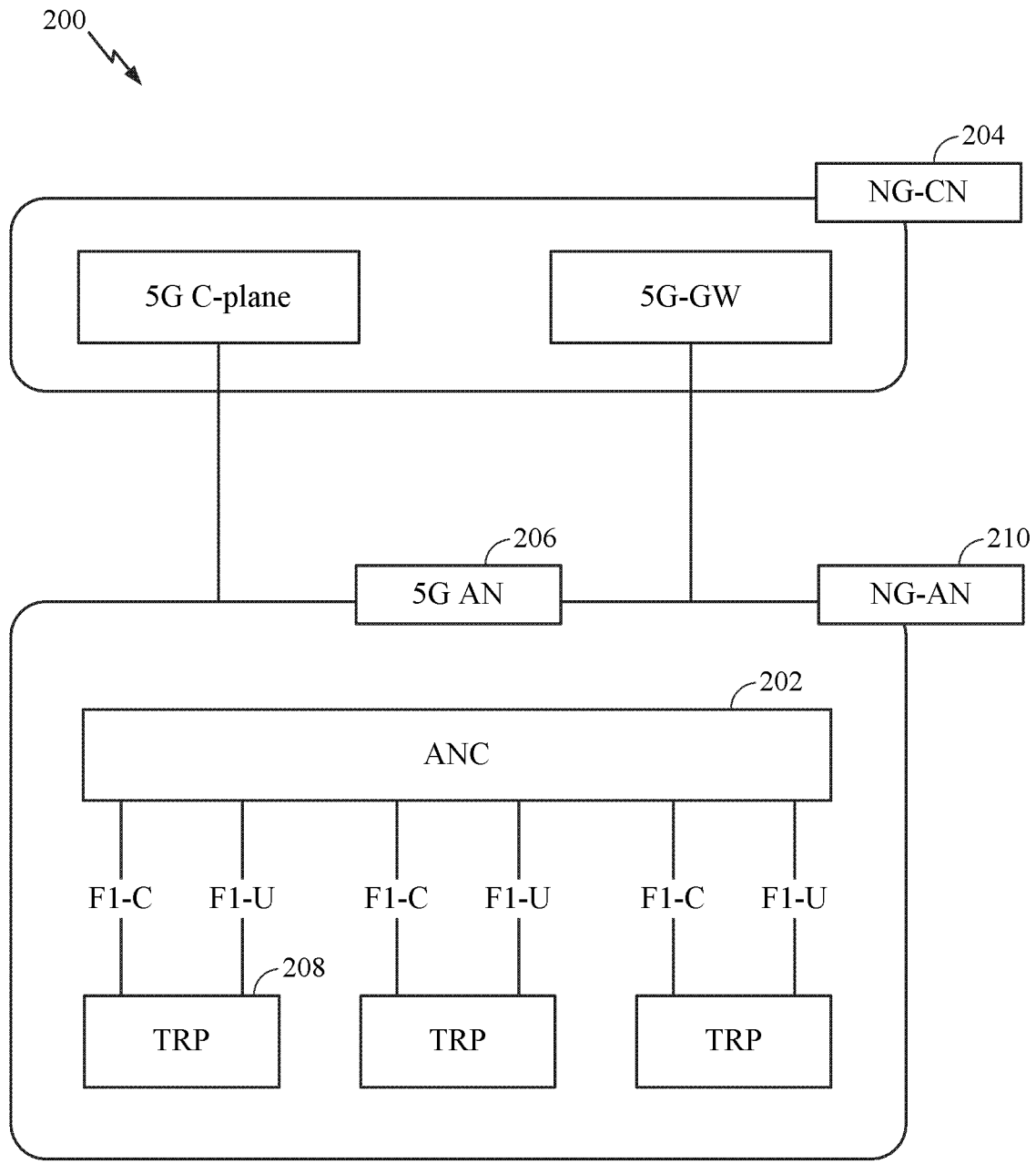
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
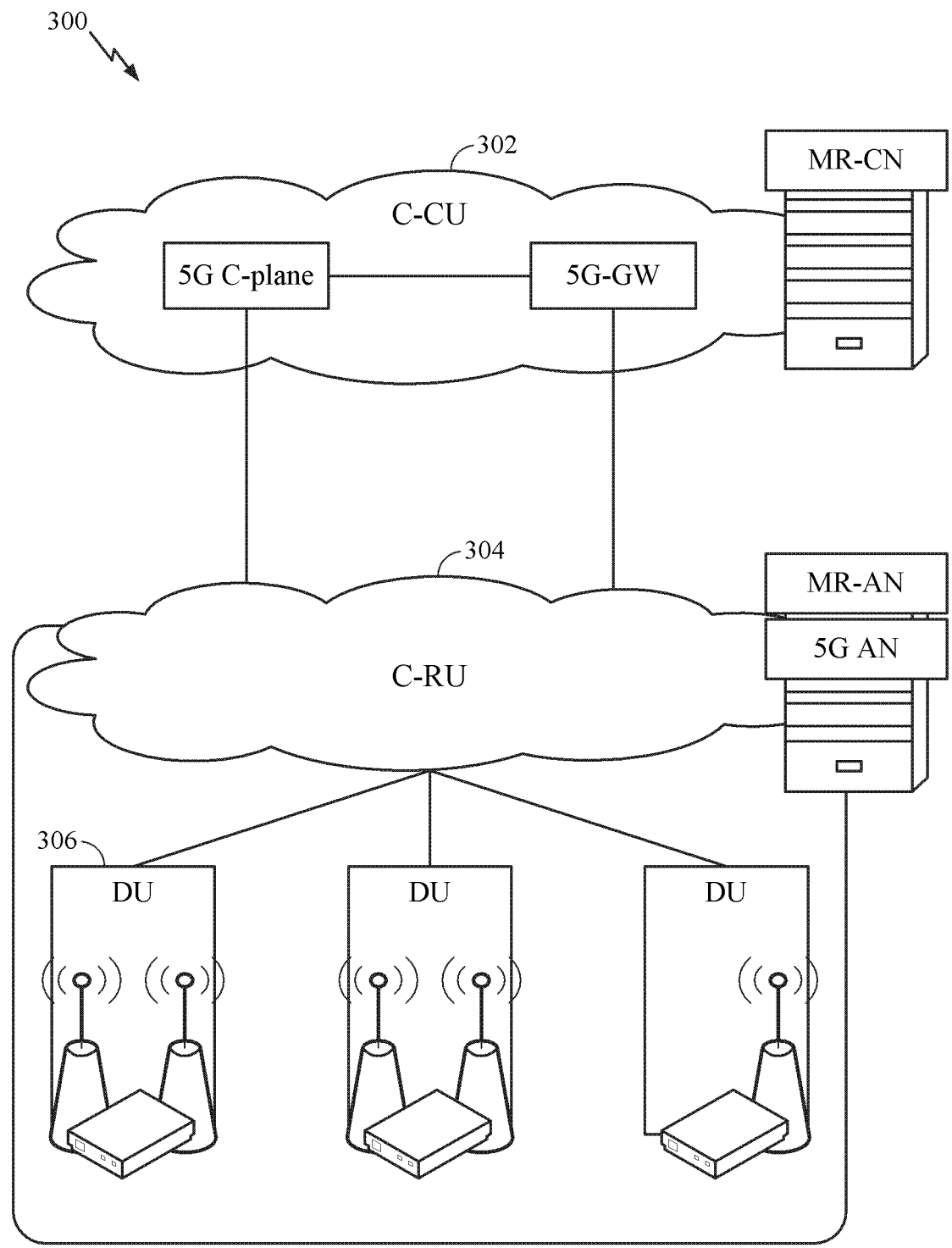
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
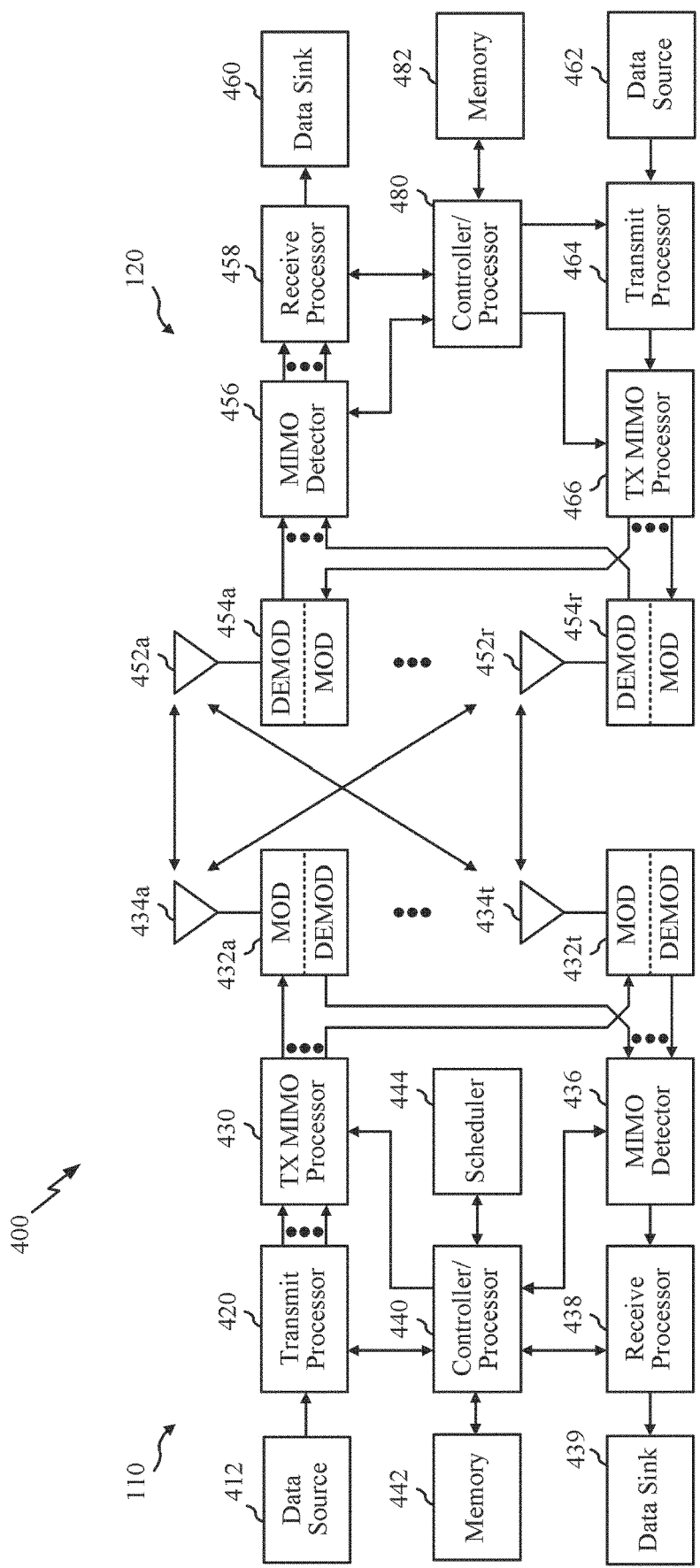
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
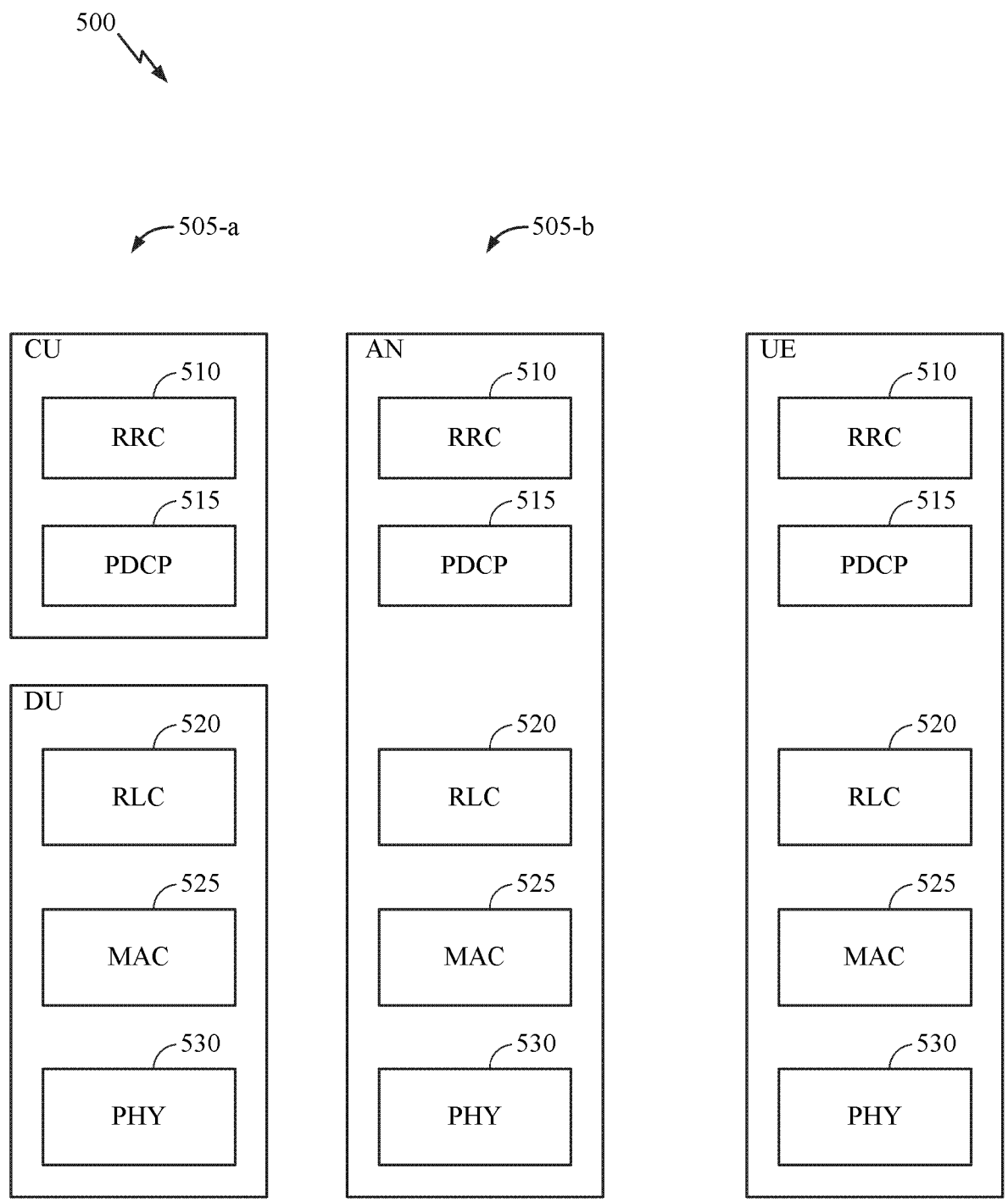
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
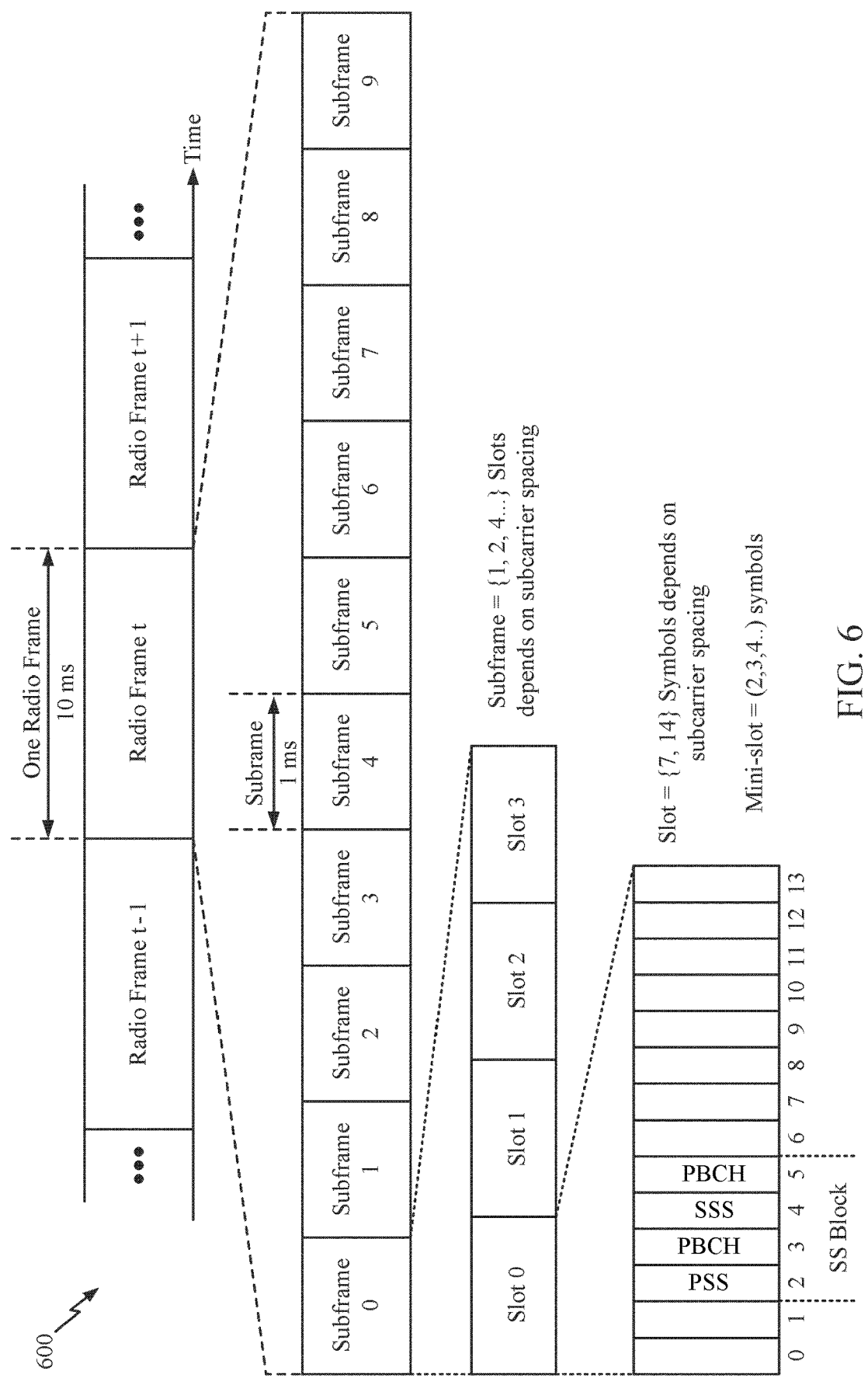
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal/physical broadcast channel (SS/PBCH) block is transmitted. The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Remote Interference Mitigation Using Reference Signals

Remote interference is a type of cross-link interference that may occur in a telecommunication system. In particular, in remote interference, DL transmissions of a first or remote base station (sometimes referred to as the "aggressor") become interference to the UL reception of another base station (sometimes referred to as the "victim"). Accordingly, the DL transmissions of the aggressor may interfere with the ability of the victim to successfully receive and decode UL transmissions (e.g., random access channel (RACH) signals such as physical RACH (PRACH), etc.) from UEs in the cell of the victim. For example, though normally antennas of a base station are oriented (e.g., tilted down) to try and ensure DL transmissions from the base station are only observable in the cell of the base station, that is not always the case. For example, the DL transmissions from the base station may be reflected (e.g., on a mountain, ocean, cloud, etc.) to a distance greater than the cell of the base station.

Figure 7:
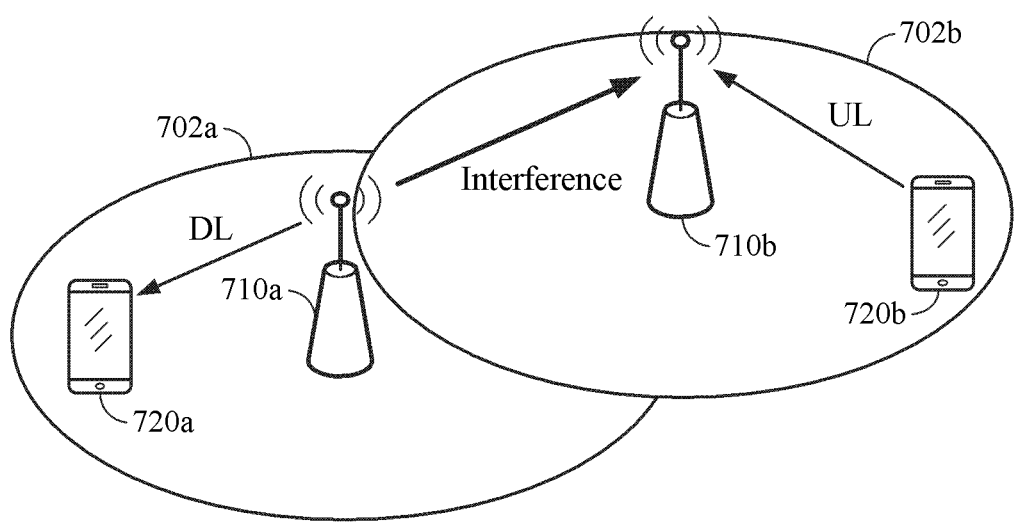
FIG. 7 illustrates remote interference that may occur in a telecommunication system, in accordance with certain aspects of the present disclosure.

FIG. 7 illustrates remote interference that may occur in a telecommunication system. FIG. 7 shows a first BS 710a (e.g., a BS 110 as shown and described in FIG. 1) with a coverage area shown by cell 702a and a second BS 710b with a coverage area shown by cell 702b. FIG. 7 further shows a first UE 720a (e.g., a UE 120 as shown and described in FIG. 1) connected to first BS 710a and a second UE 720b connected to second BS 710b.

In certain aspects, as illustrated in FIG. 7, DL transmissions from BS 710a (i.e., the aggressor) to UE 720a may interfere with UL transmissions from UE 720b to BS 710b (i.e., the victim) at BS 710b. In particular, the DL transmissions from BS 710a may be received at BS 710b and interfere with the UL transmissions from UE 720b received at BS 710b. Such remote interference between UL and DL transmissions may cause problems and poor performance. Interference may not only occur in the same channel, but also across adjacent channels.

In certain aspects, to overcome such remote interference between UL and DL transmissions, the transmission direction (e.g., UL and DL) may be aligned (also referred to as synchronized) between adjacent deployments (e.g., adjacent BSs 710a and 710b), meaning that both BSs 710a and 710b schedule UL transmissions at the same time and DL transmissions at the same time, so DL transmissions cannot interfere with UL transmissions. Accordingly, large guard bands are not needed between channels used for DL and UL, meaning the spectrum resources are utilized efficiently. However, the deployments of BS 710a and 710b may then be restricted from using different UL/DL configuration timings, which may impact performance as a strict configuration must always be adhered to.

Further, in certain cases, even if the adjacent BSs 710a and 710b are synchronized, there may still be remote interference. For example, DL transmissions from an aggressor BS 710a may be received with a delay (e.g., due to the path taken by the DL transmissions) at the victim BS 710b, such that the DL transmissions are received in a time period used for UL communication by the victim BS 710b.

Accordingly, certain aspects herein relate to measuring remote interference in a telecommunication system using reference signals. For example, certain aspects herein relate to an aggressor BS transmitting a reference signal (RS). The RS used by a first BS to indicate potential interference to one or more BSs is referred to herein as a remote interference mitigation (RIM) RS. A victim BS can receive the RIM RS, determine the RIM RS is from the aggressor BS, and perform interference measurements based on the RIM RS. For example, the victim BS can measure a signal strength (e.g., received signal strength indicator (RSSI), reference signal received power (RSRP), reference signal received quality (RSRQ), etc.) of the RIM RS.

In certain aspects, the aggressor BS and the victim BS can further perform remote interference mitigation based on the measured remote interference. For example, the victim BS can transmit information regarding the measure remote interference (e.g., via a backhaul) to the aggressor BS, and the aggressor BS can adjust its DL transmissions (e.g., timing, transmit power, beamforming, etc.). In another example, the victim BS can adjust its processing of transmissions (e.g., using receiver side beamforming, etc.).

Accordingly, certain aspects herein relate to a RS design for a RIM RS to be transmitted by a BS (e.g., a potential aggressor BS) (e.g., transmitted periodically) so that one or more other BSs (e.g., potential victim BSs) can receive the RIM RS, determine the BS that transmitted the RIM RS, and measure the interference from the BS that transmitted the RIM RS. Certain aspects provide a waveform design for the RIM RS. Certain aspects provide how and when the RIM RS is transmitted. Certain aspects provide what beams to use to transmit the RIM RS in a multi-beam scenario.

In certain aspects, the RIM RS has a design (e.g., waveform design, is sent in the same communication resources (e.g., frequency domain resources, time domain resources etc.), has the same data, the same headers, etc.) that is the same as an existing RS. For example, the RIM RS could be one of a synchronization signal/physical broadcast channel (SS/PBCH) block (sometimes referred to as a synchronization signal block (SSB)), a channel state information-RS (CSI-RS), a tracking reference signal (TRS), a positioning RS (PRS), a physical random access channel (PRACH), or a sounding RS (SRS). In certain aspects, the RIM RS has a design that is unique from other RS, or different than an existing RS.

In certain aspects, the RIM RS has a same design as and is a PRACH. Using a PRACH for the RIM RS may provide certain advantages. For example, a BS (e.g., BS 710*b* of FIG. 7) is already configured to receive a PRACH from a UE (e.g., UE 720*b* of FIG. 7) when the UE 720*b* performs a RACH procedure with the BS 710*b*. Accordingly, the BS 710*b* does not need to be configured with an additional receiver or parameters for receiving a PRACH as a RIM RS from another BS (e.g., BS 710*a* of FIG. 7). Further, a RACH procedure based on a PRACH includes a hand-shaking mechanism that can be used to provide feedback (e.g., a random access response (RAR)) from the victim BS 710*b* to the aggressor BS 710*a* when the victim BS 710*b* receives the PRACH. For example, the aggressor BS 710*a* can utilize the feedback to determine it is causing remote interference at the victim BS 710*b* and mitigate the interference accordingly.

In certain aspects, the victim BS 710*b* is configured to determine that the PRACH is a RIM RS associated with the aggressor BS 710*a* and not a PRACH sent by a UE for a RACH procedure, such as using one or more of the following techniques.

In one example, the aggressor BS 710*a* is configured to transmit a PRACH as a RIM RS multiple times according to a pattern in time. For example, the aggressor BS 710*a* transmits the PRACH in one or more time periods (e.g., symbols, slots, subframes, etc.) in a pattern (e.g., symbols 0, 1, 5, and 7). Further, in certain aspects, the aggressor BS 710*a* transmits the PRACH periodically (e.g., every x time periods) as a pattern. The victim BS 710*b* may then receive the same PRACH associated with the aggressor BS 710*a* according to the pattern, and based on receiving the same PRACH according to the pattern, determine the PRACH is associated with the aggressor BS 710*a*. The victim BS 710*b* is unlikely to receive a PRACH accordingly to such a pattern or even periodically from a UE as a RACH procedure is usually performed by a UE aperiodically and in a bursty fashion. The BSs (e.g., 710*a* and 710*b*) may be configured to know the pattern.

In another example, per a RACH procedure, the victim BS 710*b*, upon receiving a PRACH as a RIM RS from an aggressor BS 710*a*, is configured to transmit a RAR in response. Typically, a UE 120 performing a RACH procedure would receive the RAR form the victim BS 710*b* and transmit a response message (e.g., MSG3). However, in certain aspects, the aggressor BS 710*a* is configured to ignore any RAR received in response to transmitting the PRACH and not transmit a response message. Accordingly, in certain aspects, the victim BS 710*b* does not receive a response message in response to the RAR it transmitted within a time period, and when the response to the RAR is not received within the time period, determines the PRACH is associated with the aggressor BS 710*a* and not a UE.

In certain aspects, the RIM RS has a same design as and is a SS/PBCH block. In certain aspects, UEs are typically configured to receive SS/PBCH blocks from a BS. Further, the UEs are configured to monitor one or more frequencies referred to as a synchronization raster for the SS/PBCH blocks. If the UEs received a SS/PBCH block as a RIM RS, the UE may treat it as a normal SS/PBCH block, which can cause errors at the UE. Accordingly, in certain aspects, where the RIM RS is a SS/PBCH block, the RIM RS is transmitted at a different one or more frequencies than (e.g., according to an offset in frequency from) the synchronization raster. The BSs (e.g., 710*a* and 710*b*) may be configured to know the different one or more frequencies.

In certain aspects, BSs 710*a* and 710*b* communicate in time periods such as slots, subframes, etc. In certain aspects, a slot and/or subframe used for communication by a BS includes resources (e.g., symbols) allocated for downlink communication and resources allocated for uplink communication. In certain aspects, the resources for downlink communication are first in time (e.g., and contiguous) in the slot and/or subframe and are followed in time by a gap period (e.g., that is contiguous) where no communication occurs. Further, the resources for uplink communication are last in time (e.g., and contiguous) and follow in time the gap period. In certain aspects, if transmission direction (e.g., UL and DL) are aligned/synchronized between adjacent BSs (e.g., BSs 710*a* and 710*b*) then a potential aggressor BS 710*a* is configured to transmit the RIM RS in the last symbol in time allocated to downlink communication in a slot/subframe. In certain aspects, if transmission direction (e.g., UL and DL) are aligned/synchronized between adjacent BSs (e.g., BSs 710*a* and 710*b*) then a potential aggressor BS 710*a* is configured to transmit the RIM RS in the first symbol in time allocated to uplink communication in a slot/subframe. This may beneficially allow time for the RIM RS to be processed during the gap period. In certain aspects, if the transmission direction is not aligned/synchronized between adjacent BSs, then a potential aggressor BS 710*a* can be configured to transmit the RIM RS at any time.

In certain aspects, an aggressor BS 710*a* is configured to transmit the RIM RS periodically. In certain aspects, the periodicity with which the aggressor BS 710*a* transmits the RIM RS is based on an amount of data transmissions from the aggressor BS 710*a*. For example, if the aggressor BS 710 has more data to transmit on the downlink, it may transmit RIM RS with a higher periodicity (i.e., more frequently) to account for a higher likelihood of remote interference. If the aggressor BS 710 has less data to transmit on the downlink, it may transmit RIM RS with a lower periodicity (i.e., less frequently).

A BS may use multiple physical antennas for transmissions. However, the BS may not use each antenna separately for transmissions. Instead, the BS may combine certain antennas and use the combination (e.g., linear combination) of antennas as essentially one virtual antenna for transmission. Each virtual antenna (e.g., a single antenna or combination of antennas) utilized for transmissions may be "visible" to a receiver (e.g., victim BS 710*b*) and be referred to as an antenna port.

In certain aspects, an aggressor BS 710*a* is configured to transmit the RIM RS on only a single antenna port of the BS 710*a*. Accordingly, even if the RIM RS is transmitted periodically by the BS 710*a*, the RIM RS is transmitted on the same antenna port.

In certain aspects, an aggressor BS 710*a* is configured to transmit the RIM RS on multiple antenna ports of the BS 710*a*. However, in certain aspects, the aggressor BS 710*a* is configured to transmit the RIM RS on only a single antenna port of the multiple antenna ports of the BS 710*a* at a time. For example, if the aggressor BS 710*a* transmits the RIM RS periodically, it may transmit the RIM RS on a first antenna port at a first period, on a second antenna port at a second period, etc.

In certain aspects, the aggressor BS 710*a* is able to perform beamforming (e.g., digital beamforming, such as of a baseband signal at a pre-encoder of the BS 710*a*; and/or analog beamforming). In certain aspects, if the aggressor BS 710a is configured to communicate in frequencies below-6 GHz the aggressor BS 710a uses digital beamforming. In certain aspects, if the aggressor BS 710a is configured to communicate in frequencies above-6 GHz the aggressor BS 710a uses analog beamforming.

In certain aspects, when the aggressor BS 710a communicates in frequencies below-6 GHz, the aggressor BS 710a uses a single beam (e.g., a uniform beam in all directions) for transmitting the RIM RS. In certain such aspects, if the aggressor BS 710a is configured to use multiple beams for transmitting on a DL, a new single beam is used to transmit the RIM RS. For example, a new antenna is added to the aggressor BS 710a that is separate from the antennas used to transmit the DL transmissions, and the new antenna is used to transmit the RIM RS.

In certain aspects, when the aggressor BS 710a communicates in frequencies above-6 GHz, the aggressor BS 710a uses multiple beams (e.g., in different directions) for transmitting the RIM RS. In certain aspects, the aggressor BS 710a uses multiple beams regardless of the frequency (e.g., also for below-6 GHz).

In certain aspects, an aggressor BS 710a is configured with a plurality of possible beams it can transmit data on. However, the aggressor BS 710a may not actively transmit data on the DL on all the plurality of possible beams, and instead only transmit on a set of active beams of the plurality of beams. In certain such aspects, the aggressor BS 710a is configured to transmit RIM RS on only the set of active beams as those are the beams where there may be remote interference.

Figure 8:
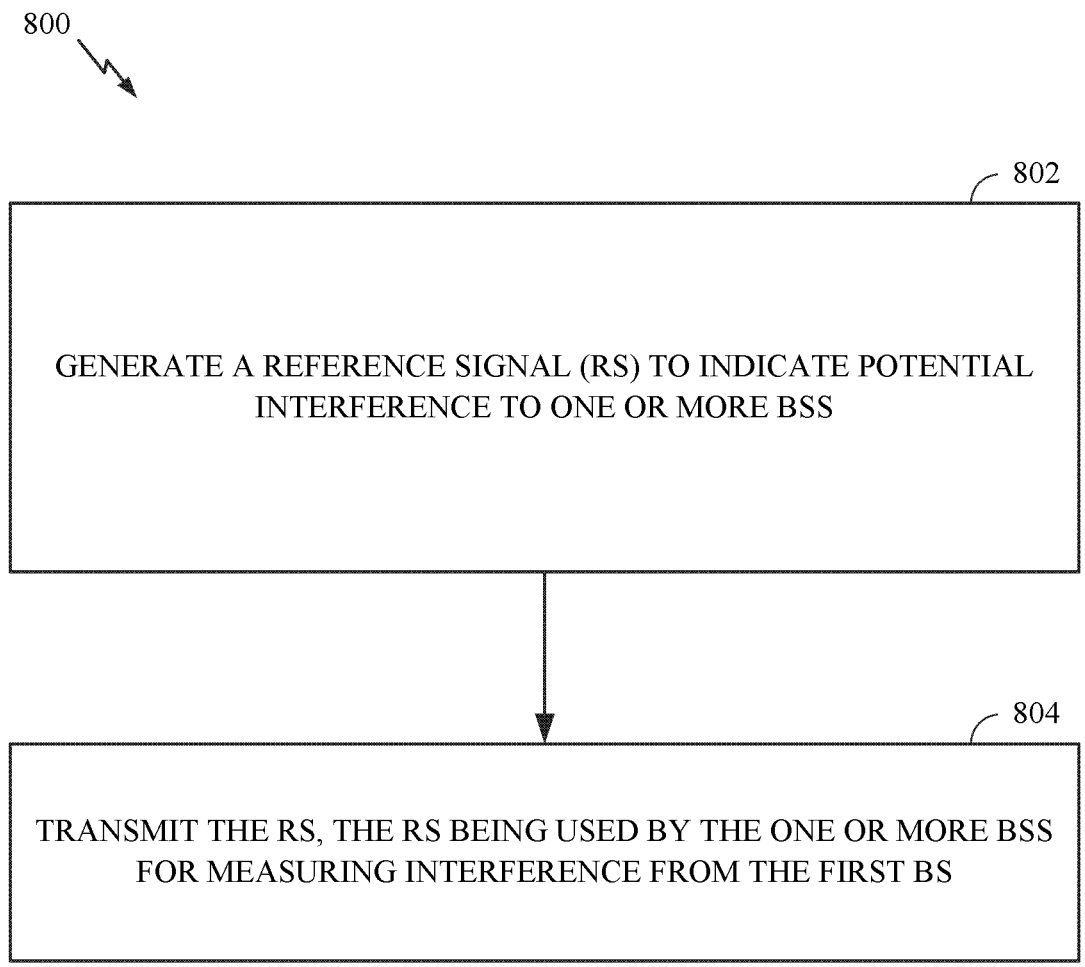
FIG. 8 illustrates example operations that may be performed by a wireless device for interference mitigation in accordance with aspects of the present disclosure.

FIG. 8 illustrates example operations that may be performed by a wireless device (e.g., BS 110/710) for interference mitigation in accordance with aspects of the present disclosure. Operations 800 may be performed by an aggressor BS.

Operations 800 begin, at 802, by generating a reference signal (RS) to indicate potential interference to one or more BSs. At 804, operations 800 continue by transmitting the RS, the RS being used by the one or more BSs for measuring interference from the first BS.

Figure 9:
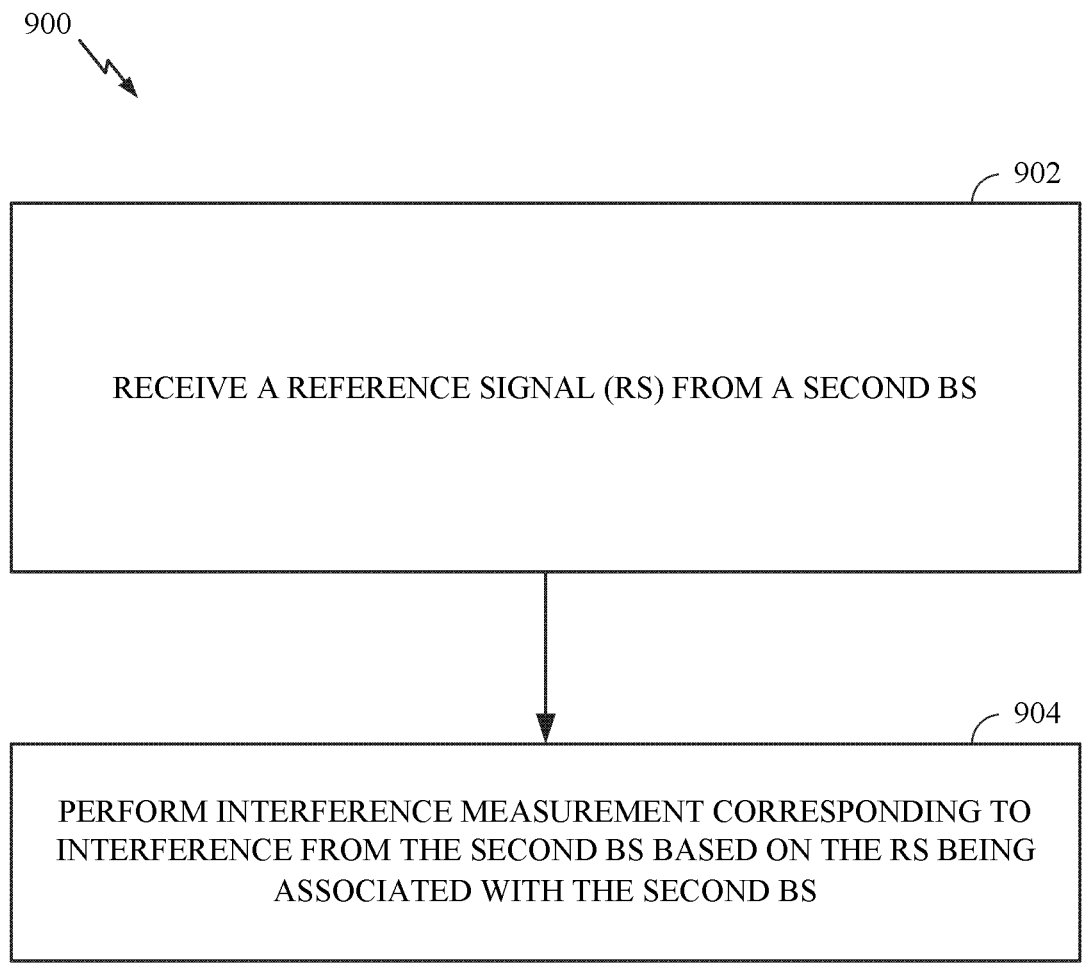
FIG. 9 illustrates example operations that may be performed by a wireless device for interference mitigation in accordance with aspects of the present disclosure.

FIG. 9 illustrates example operations that may be performed by a wireless device (e.g., BS 110/710) for interference mitigation in accordance with aspects of the present disclosure. Operations 900 may be performed by a victim BS.

Operations 900 begin, at 902, by receiving a reference signal (RS) from a second BS. At 904, operations 900 continue by performing interference measurement corresponding to interference from the second BS based on the RS being associated with the second BS.

Figure 10:
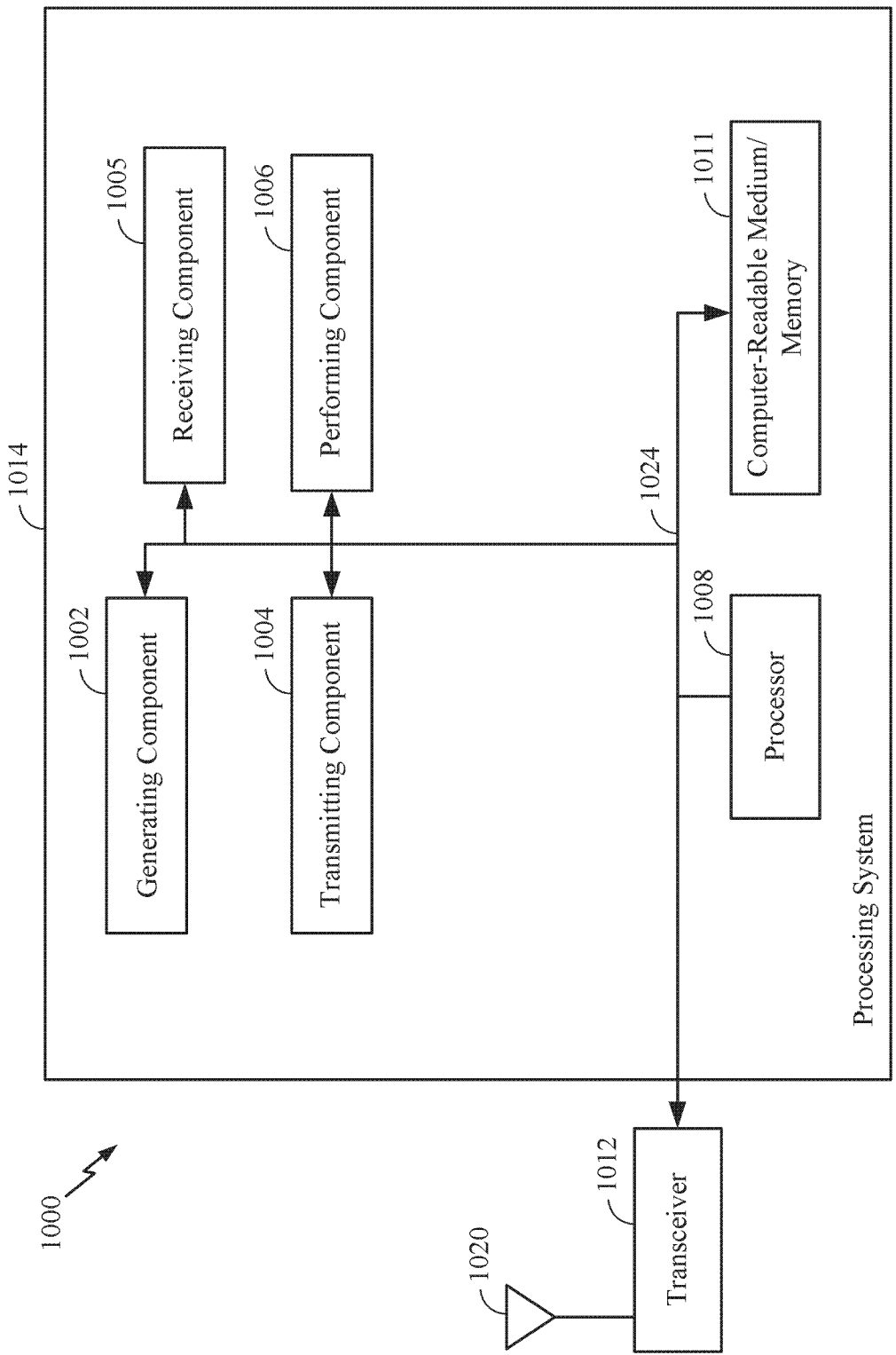
FIG. 10 illustrates a communications device that may include various components configured to perform operations for the techniques disclosed herein, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 8 and/or 9. The communications device 1000 includes a processing system 1014 coupled to a transceiver 1012. The transceiver 1012 is configured to transmit and receive signals for the communications device 1000 via an antenna 1020, such as the various signal described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1011 via a bus 1024. In certain aspects, the computer-readable medium/ memory 1011 is configured to store instructions that when executed by processor 1008, cause the processor 1008 to perform the operations illustrated in FIGS. 8 and/or 9, or other operations for performing the various techniques discussed herein.

In certain aspects, the processing system 1014 further includes a generating component 1002 for performing the operations illustrated at 802 in FIG. 8. Additionally, the processing system 1014 includes a transmitting component 1004 for performing the operations illustrated at 804 in FIG. 8. The processing system 1014 also includes a receiving component 1005 for performing the operations illustrated at 902 in FIG. 9. The processing system 1014 also includes a performing component 1006 for performing the operations illustrated at 904 in FIG. 9. The generating component 1002, transmitting component 1004, receiving component 1005, and performing component 1006 may be coupled to the processor 1008 via bus 1024. In certain aspects, the generating component 1002, transmitting component 1004, receiving component 1005, and performing component 1006 may be hardware circuits. In certain aspects, the generating component 1002, transmitting component 1004, receiving component 1005, and performing component 1006 may be software components that are executed and run on processor 1008.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example. "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and/or 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first base station (BS), the method comprising:
   transmitting a remote interference mitigation reference signal (RIM-RS) to indicate potential interference to one or more second BSs, wherein the RIM-RS is different than a synchronization signal/physical broadcast channel (SS/PBCH) block, a channel state information reference signal (CSI-RS), a tracking reference signal (TRS), a positioning reference signal (PRS), a physical random access channel (PRACH), and a sounding reference signal (SRS); and
   receiving remote interference information from at least one of the one or more second BSs in response to the RIM-RS.

2. The method of claim 1, wherein transmitting the RIM-RS comprises transmitting the RIM-RS multiple times according to a pattern in time.

3. The method of claim 2, wherein transmitting the RIM-RS multiple times according to the pattern in time comprises transmitting the RIM-RS periodically in time.

4. The method of claim 3, wherein transmitting the RIM-RS comprises transmitting the RIM-RS in a last symbol in time allocated to downlink communication in a slot according to the periodicity.

5. The method of claim 1, wherein transmitting the RIM-RS comprises transmitting the RIM-RS in a first symbol in time allocated to uplink communication in a slot.

6. The method of claim 1, wherein transmitting the RIM-RS comprises transmitting the RIM-RS periodically.

7. The method of claim 1, wherein transmitting the RIM-RS periodically comprises transmitting the RIM-RS periodically based on an amount of data transmissions from the first BS.

8. The method of claim 1, wherein transmitting the RIM-RS comprises transmitting the RIM-RS through only a single antenna port of the first BS.

9. The method of claim 1, wherein transmitting the RIM-RS comprises transmitting the RIM-RS through multiple antenna ports of the first BS one at a time over time.

10. The method of claim 1, wherein transmitting the RIM-RS comprises transmitting the RIM-RS on a single beam at below 6 GHz.

11. The method of claim 10, wherein transmitting the RIM-RS comprises transmitting the RIM-RS on a separate antenna of the first BS than used for data transmissions.

12. The method of claim 1, wherein transmitting the RIM-RS comprises transmitting the RIM-RS on multiple beams at below 6 GHz.

13. The method of claim 1, wherein transmitting the RIM-RS comprises transmitting the RIM-RS on multiple beams at above 6 GHz.

14. The method of claim 1, wherein transmitting the RIM-RS comprises transmitting the RIM-RS on a set of active beams of a plurality of beams the first BS is configured to transmit.

15. A method for wireless communication by a first base station (BS), the method comprising:
   receiving a remote interference mitigation reference signal (RIM-RS) from a second BS, wherein the RIM-RS is different than a synchronization signal/physical broadcast channel (SS/PBCH) block, a channel state information reference signal (CSI-RS), a tracking reference signal (TRS), a positioning reference signal (PRS), a physical random access channel (PRACH), and a sounding reference signal (SRS);
   performing interference measurement of the RIM-RS to determine remote interference caused by the second BS based on the RIM-RS being associated with the second BS; and
   transmitting remote interference information to the second BS.

16. The method of claim 15, wherein the RIM-RS comprises receiving the RS multiple times, further comprising:
   determining a pattern in time of the RIM-RS received multiple times; and
   determining the RIM-RS is associated with the second BS based on the pattern in time of the RIM-RS.

17. The method of claim 16, wherein receiving the RIM-RS multiple times according to the pattern in time comprises receiving the RIM-RS periodically in time.

18. A method for wireless communication by a first base station (BS), the method comprising:
   receiving a reference signal (RS) from a second BS, wherein receiving the RS comprises receiving a physical random access channel (PRACH);
   transmitting a random access response (RAR) in response to receiving the PRACH;
   determining the PRACH is associated with the second BS when a response to the RAR is not received within a time period;
   performing interference measurement corresponding to interference from the second BS based on the RS being associated with the second BS; and
   transmitting remote interference information to the second BS in response to the RS.

19. The method of claim 15, wherein receiving the RIM-RS comprises receiving the RIM-RS in a last symbol in time allocated to downlink communication in a slot.

20. The method of claim 15, wherein receiving the RIM-RS comprises receiving the RIM-RS in a first symbol in time allocated to uplink communication in a slot.

21. The method of claim 15, further comprising performing interference management based on the interference measurement to reduce interference at the first BS from the second BS.

22. A first base station (BS) comprising:
a memory comprising computer executable code stored thereon; and
a processor coupled to the memory, the processor being configured to execute the computer executable code and cause the first BS to:
transmit a remote interference mitigation reference signal (RIM-RS) to indicate potential interference to one or more second BSs, wherein the RIM-RS is different than a synchronization signal/physical broadcast channel (SS/PBCH) block, a channel state information reference signal (CSI-RS), a tracking reference signal (TRS), a positioning reference signal (PRS), a physical random access channel (PRACH), and a sounding reference signal (SRS); and
receive remote interference information from at least one of the one or more second BSs in response to the RIM-RS.

23. A first base station (BS) comprising:
a memory comprising computer executable code stored thereon; and
a processor coupled to the memory, the processor being configured to execute the computer executable code and cause the first BS to:
receive a remote interference mitigation reference signal (RIM-RS) from a second BS, wherein the RIM-RS is different than a synchronization signal/physical broadcast channel (SS/PBCH) block, a channel state information reference signal (CSI-RS), a tracking reference signal (TRS), a positioning reference signal (PRS), a physical random access channel (PRACH), and a sounding reference signal (SRS);
performing interference measurement of the RIM-RS to determine remote interference caused by the second BS based on the RIM-RS being associated with the second BS;
perform interference measurement corresponding to interference from the second BS based on the RS being associated with the second BS; and
transmit remote interference information to the second BS in response to the RS.

24. A method for wireless communication by a first base station (BS), the method comprising:
transmitting a reference signal (RS) to indicate potential interference to one or more second BSs, wherein transmitting the RS comprises transmitting a physical random access channel (PRACH) transmission;
receiving a random access response (RAR) in response to the PRACH transmission;
refraining from transmitting a response to the RAR to indicate the PRACH transmission is associated with the first BS; and
receiving remote interference information from at least one of the one or more second BSs in response to the RS.

25. The method of claim 1, wherein the remote interference information indicates potential interference by downlink transmission of the first BS to an uplink transmission to the second BS.

26. The method of claim 25, wherein the first BS and the second BS have an aligned time division duplexing (TDD) configuration, and wherein the downlink transmission by the first BS is delayed by a duration longer than a guard period of the TDD configuration.

* * * * *